(12) United States Patent
Sorkin

(10) Patent No.: US 7,686,347 B1
(45) Date of Patent: Mar. 30, 2010

(54) COUPLERS FOR USE WITH DUCTS OF CONCRETE SEGMENTAL CONSTRUCTION

(76) Inventor: Felix L. Sorkin, 13022 Trinity Dr., Stafford, TX (US) 77477

( * ) Notice: Subject to any disclaimer, the term of this patent is extended or adjusted under 35 U.S.C. 154(b) by 219 days.

(21) Appl. No.: 11/861,166

(22) Filed: Sep. 25, 2007

(51) Int. Cl.
*F16L 51/02* (2006.01)

(52) U.S. Cl. .................. 285/229; 285/230; 285/226; 285/237; 52/220.2; 52/220.4; 52/223.9

(58) Field of Classification Search .......... 285/223, 285/226, 227, 229, 230, 231, 237, 363; 52/220.1–220.8, 52/223.1–223.14, 250, 790.1
See application file for complete search history.

(56) References Cited

U.S. PATENT DOCUMENTS

| | | | |
|---|---|---|---|
| 5,704,656 A * | 1/1998 | Rowe | 285/93 |
| 5,799,702 A * | 9/1998 | Hsien-Jen et al. | 138/120 |
| 6,224,115 B1 * | 5/2001 | Blasch et al. | 285/139.2 |
| 6,764,105 B1 | 7/2004 | Sorkin | |
| 6,834,890 B2 * | 12/2004 | Sorkin | 285/230 |
| 6,874,821 B1 | 4/2005 | Sorkin | |
| 2006/0049627 A1 * | 3/2006 | Happel | 285/230 |

* cited by examiner

*Primary Examiner*—James M Hewitt
*Assistant Examiner*—Gwendolyn Fournet
(74) *Attorney, Agent, or Firm*—Egbert Law Offices PLLC

(57) ABSTRACT

A coupler apparatus for use with concrete segments has a first duct, a first coupler member having a connector and a flexible boot extending therefrom and having an end extending over a surface of said first duct, a second duct, a second coupler member having a connector and a flexible boot extending therefrom and extending over an exterior surface of the second duct, and a gasket received in the connectors of the first and second coupler members for forming a liquid-tight seal between the first and second ducts. Clamps are affixed over the ends of the flexible boot so as to establish a liquid-tight seal with the respective ducts. The connector includes an annular section affixed to an end of the flexible boot and an annular groove formed around this annular section.

13 Claims, 8 Drawing Sheets

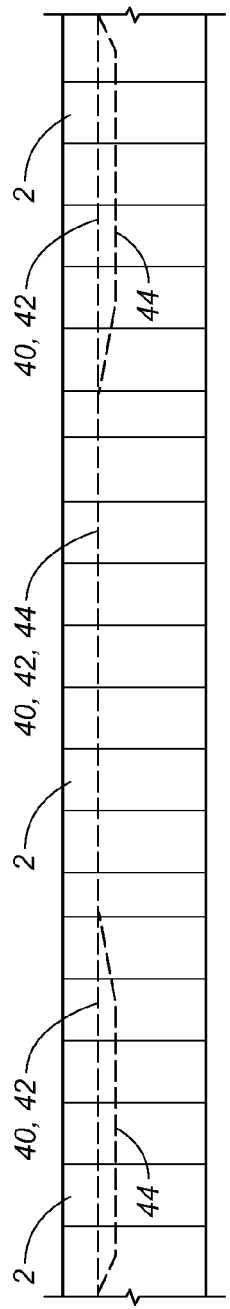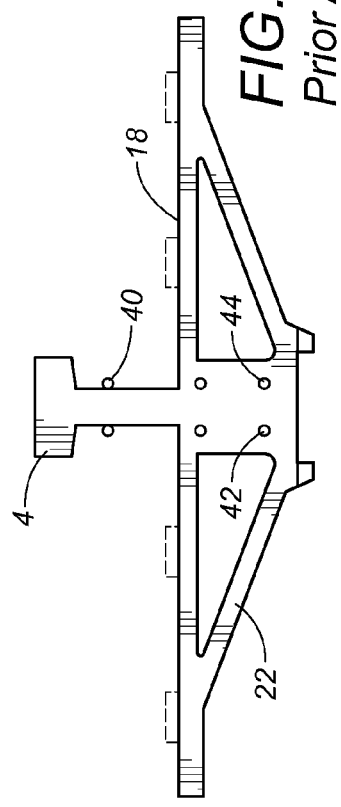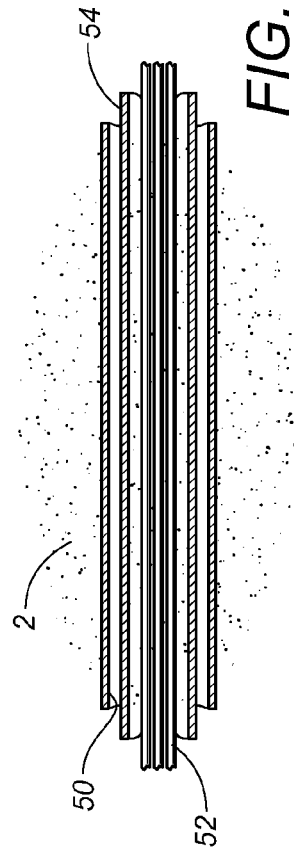
FIG. 2 Prior Art
FIG. 3 Prior Art
FIG. 4 Prior Art

COUPLERS FOR USE WITH DUCTS OF CONCRETE SEGMENTAL CONSTRUCTION

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to the assembly and installation of precast concrete segments used in construction activities, such as bridge and highway construction. More particularly, the present invention relates to couplers for joining the ends of interior ducts of such precast concrete segments in end-to-end liquid-tight relationship.

2. Description of Related Art Including Information Disclosed Under 37 CFR 1.97 and 37 CFR 1.98.

Precast segmental bridges are known and commonly used throughout the world as a means to forge roadways through mountainous terrain or across rivers or other barriers. Such bridges are typically constructed in accordance with the following sequence: First, a series of upright piers are formed along the bridge span. Thereafter, cantilevered bridge section are built out of each pier by successively mounting the precast segments to previously completed bridge components and post-tensioning the segments thereto. The cantilevered bridge sections are built out from each pier in a symmetrical fashion so that the piers are not subjected to undue bending loads. When the cantilevered sections are complete, the ends thereof are post-tensioned together to form a continuous bridge deck. Typically, two such bridge spans are constructed to accommodate the two directions of travel. These spans are generally side-by-side, but need not be parallel (horizontally or vertically) nor at the same elevation.

FIGS. 1-4 illustrate a form of such precast segmental bridge construction in accordance with the teachings of U.S. Pat. No. 5,231,931, issued on Aug. 3, 1993 to G. Sauvagiot. This form of segmental precast bridge construction is particularly disclosed as used with a rapid transit viaduct system.

Referring to FIG. 1, a rapid transit viaduct section 2 includes a central load bearing span or body member 4 supported by a pair of upright pier members 6 and 8. Extending laterally from opposite lower side portions of the central body 4 are a pair of lateral platform structures 10 and 12. Each of the platform structures 10 and 12 has a pair of rails 14 mounted thereon for carrying a rapid transit vehicle. In addition, each of the platform sections may be provided with an upright sidewall section 16 as required for safety, noise pollution and other considerations. One or more sets of rails 14 are carried by each of the lateral platform structures depending on the requirements of the transit systems.

The platform structures 10 and 12 each include respective upper platform decks and respective lower support struts 22 and 24. The lower support struts 22 and 24 are mounted as close to the bottom of the central load bearing body 4 as practicable. Deck members 18 and 20 are mounted to the central body 4 at an intermediate portion thereof above the support struts 22 and 24. The support struts 22 and 24 angle upwardly from their point of attachment with the load bearing body 4 until they intersect the deck members 18 and 20. As such, the deck members 18 and 20 and support struts 22 and 24 form a box section providing resistance to torsional loading caused by track curvature and differential train loading. This box section may be considered a closed base. The load bearing body 4 bisects the closed base and extends vertically upwardly therefrom to provide span-wise bending resistance. Preferably, the entire duct section 2 is cast as a single reinforced concrete cross-section.

The platform sections 10 and 12 each include lower pier mounts 26 and 28. These are mounted respectively to the bottom of the support structures 22 and 24. The pier mounts 26 and 28 are, in turn, supported, respectively, on the piers 6 and 8 using a plurality of neoprene pads 30, which provide a cushioned support for the structure.

As shown in FIG. 1, the viaduct section 2 forms part of a viaduct system supporting rails 14 for carrying rapid transit vehicles 32 and 34. The viaduct section 2 may be formed as a precast modular segment. The viaduct section 2 is then combined with other viaduct sections to form a precast segmental structure. To facilitate such construction, the load bearing body 4 may be formed with interlock member 36, while the lateral platform structures 10 and 12 may be each formed with interlock members 38.

Referring to FIG. 2, a viaduct system is formed from a plurality of precast sections 2 formed as modular segments and combined as a precast segmental structure extending between sequentially positioned piers (not shown). The sections 2 are placed in longitudinally abutting relationship. To facilitate that construction, the sections are match cast so that the abutting end portions thereof fit one another in an intimate interlocking relationship. Each successive section is therefor cast against a previously cast adjacent section to assure interface continuity.

The connection between adjacent modular sections 2 is further secured by way of the interlock members 36 and 38. On one end of each section 2, the interlock members 36 and 38 are formed as external keys. On the opposite end of each section 2, the interlock members are formed as an internal slot or notch, corresponding to the key members of the adjacent viaduct system. Match casting assures that corresponding keys and slots, as well as the remaining interface surfaces, properly fit one another.

As seen in FIG. 2, the sections 2 are bound together with one or more post-tensioning cables or tendons 40, 42 and 44. The number of cables used will depend on a number of factors such as cable thickness, span length and loading requirements. The tensioning cables are each routed along a predetermined path which varies in vertical or lateral position along the span of the segmental structure.

FIG. 3 illustrates, diagrammatically, the manner in which the post-tensioning cables 40, 42 and 44 extend through the concrete structure of the spans. As can be seen in FIG. 3, the post-tensioning cables are sometimes positioned within the concrete segment themselves, and at other times are positioned externally thereof.

It is important to note that multiple post-tension cables are often used as extending through ducts within the concrete structure. In FIG. 4, it can be seen that the sections 2 are formed with appropriate guide ducts 50 at locations where the post-tensioning cables passed through the structure. The post-tensioning cable identified collectively by reference numeral 52 in FIG. 4, are routed through the guide ducts 50. To facilitate this routing, a continuous flexible conduit 54 is initially inserted through the guide ducts, and the post-tensioning cables 52 are thereafter placed in the conduit. The conduit 54 may advantageously be formed from polyethylene pipe but could also be formed from flexible metallic materials. The post-tensioning cables 52 are tensioned using conventional post-tensioning apparatus and the interior of the conduit 54 is cement grouted along the entire length thereof for corrosion protection.

One form of duct that is commercially available is shown in FIG. 5. The corrugated polymeric duct 56 is of a type presently manufactured by General Technologies, Inc. of Stafford, Tex., licensee of the present inventor. As can be see in FIG. 5, duct 56 has a plurality of corrugations 58 extending radially outwardly from the generally tubular body 60. The duct 56 has ends 62 and 64 through which post-tensioning cables can emerge. In FIG. 5, it can be seen that there are longitudinal channels 66, 68 and 70 extending along the outer surface of the tubular body 60. The longitudinal channels 66, 68 and 70 allow any grout that is introduced into the interior of the duct 56 to flow easily and fully through the interior of the duct 56. The longitudinal channels 66, 68 and 70 also add structural integrity to the length of the duct 56. It is important to realize that the duct 56 can be formed of a suitable length so as to extend fully through one of the sections 2 as used in a precast segmental structure.

Unfortunately, when such ducts, such as duct 56, are used in such precast segmental construction, it is difficult to seal the ends 62 and 64 of each duct to the corresponding duct of an adjacent section of the segmental structure. Conventionally, the segments are joined together in end-to-end relationship through the application of an epoxy material to the matching surfaces of the structure. Under such circumstances, it is very common for the epoxy to flow or to become extruded into the opening at the ends 62 and 64 of the duct when the segments are connected in end-to-end relationship. In other circumstances, a grout is pumped through the interior passageway of the duct 56 so as to offer a seal against the intrusion of air and water into the interior of the duct 56. The grout is pumped through the interior of the ducts. Unfortunately, if there is an incomplete connection between the duct 56 and the duct of an adjoining section of the segmental structure, then the epoxy will leak out into the interface area between the segments and will not flow fully through the entire duct assembly. Once again, an incomplete grouting of the interior of the duct 56 may occur.

It is important to note that in such precast concrete segmental construction, the concrete will slightly warp when matched with the adjoining section. Even though match casting is employed, the lack of homogeneity in the concrete mixtures used for the adjoining sections can cause a misalignment between matching sections. A great deal of tolerance must be maintained when a coupler is developed so that any warping or distortion in the surfaces of the matching segments can be accommodated.

The ability to avoid air and liquid intrusion into the interior of the duct 56 is very important in such multi-strand, precast concrete segmental structures. As can be seen in FIG. 1, since the structure is often used on bridges or elevated structures, the post-tensioning cables can be subject to a great deal of exposure from the elements. For example, if the bridge structure is associated with roads traveled by motor vehicles, then there is often the application of salt onto the highway. This salt, when dissolved in water, can leach through the area between the structure segments into the ducts and deteriorate the post-tensioning cables over time. As the post-tensioning cables become corroded, over time, they can weaken so as to potentially cause the failure of the segmental structure. Past experience with such structures has shown that the primary area of leakage would be through those cracks formed between those matched segments. As such, it is particularly important to provide a coupler for use in association with the plastic ducts which will effectively prevent any liquid intrusion from entering the area interior of the ducts and adjacent to the post-tensioning cables.

The present invention is the owner of several patents relating to duct couplers for use with precast concrete segmental construction. In particular, U.S. Pat. No. 6,764,105, issued on Jul. 20, 2004, describes a coupler member for use with precast concrete segmental structures. The structure is illustrated in FIGS. 6 and 7 herein. Referring to FIG. 6, there is shown the precast concrete segmental structure 100 in accordance with the teachings of this patent. The structure 100 includes a first concrete segment 102 and a second concrete segment 104. The first concrete segment 102 has an outer surface 106 which is joined in surface-to surface contact with the inner surface 108 of the concrete segment 104. The segments 102 and 104 are formed by match casting, as described hereinbefore.

Importantly, a first duct 110 is embedded in the first concrete structure 102. Duct 110 has a construction similar to that shown in FIG. 5, or similar to other multi-cable ducts. The first duct 110 has an end 112 generally adjacent to the exterior surface 106 of the concrete segment 102. Similarly, a second duct 114 is embedded in the second concrete segment 104. The second duct 114 has a configuration similar to that of duct 110. Duct 114 has an end 116 generally adjacent to the inner surface 108 of concrete segment 104. Each of the ducts 110 and 114 are embedded in the respective concrete segments 102 and 104 so as to be generally longitudinally aligned. The duct 110 has an interior passageway which will be axially aligned with the interior passageway of duct 114.

As can be seen in FIG. 6, a plurality of tendons 118 extend longitudinally through the interior passageways of the ducts 110 and 114. In FIG. 6, these tendons 118 are properly post-tensioned in a conventional manner. A grouting material 120 is introduced through the interior passageways 110 and 114 to further cement and seal the interior of the ducts 110 and 114 around the tendons 118. The grouting material, in combination with the polymeric material of the ducts 110 and 114, serves to avoid the adverse effects of liquid intrusion into the tendons 118. A unique coupler apparatus 122 further assures the avoidance of liquid intrusion through the space between the exterior surface 106 of concrete segment 102 and the inner surface 108 of concrete segment 104. A first coupler member 124 extends over and around the exterior surface of the first duct 110. The first coupler member 124 has an end 126 opening at the exterior surface 106 of concrete segment 102. Similarly, the end 126 of the coupler member 124 is generally forward of, but adjacent to, the end 112 of first duct 110. A second coupler member 128 extends over and around the exterior surface of the second duct 114. The second coupler member 128 has an end 130 opening at the inner surface 108 of concrete segment 104. End 130 is slightly forward of the end 116 of the duct 114. A gasket 132 is received in the ends 126 and 130 of the respective coupler members 124 and 128. The gasket 132 is particularly designed to prevent liquid from passing between the ends 126 and 130 of the respective coupler members 124 and 128 into the interior of the ducts 110 and 114. The coupler members 124 and 128 have an identical configuration to each other. This serves to minimize the manufacturing requirements since only a single mold is required for each of the coupler members. Also, installation is easy since unskilled workers can install the first and second coupler members without regard to the configuration of a particular coupler member.

An external seal 134 is affixed in generally liquid-tight relationship to an opposite end 136 of the first coupler member 124 and is also affixed to an exterior surface of the first duct 110. In particular, the external seal 134 is formed of an elastomeric sleeve or an annular heat shrink material. The external seal 134 will be in compressive liquid-tight contact with the exterior surface of the first coupler member 124 and with the exterior surface of the duct 110. Prior to embedding the coupler member 124 into the concrete associated with the concrete segment 102, the coupler member 124 can be affixed in liquid-tight relationship by applying heat to the exterior surface of the external seal 134. As a result, the heat-shrink material of the external seal 134 will tightly engage the surfaces of the coupler member 124 and also the exterior surfaces of the duct 110. As a result, the external seal 134 will prevent liquid intrusion through the opposite end 136 of the coupler member 124.

An internal seal 138 is interposed in generally liquid-tight relationship between the interior surface of the second coupler member 128 and the exterior surface of the second duct 114. This internal seal 138 is a generally annular ring formed of an elastomeric material. The internal seal 138 is positioned to allow relative movement between the second coupler member 128 and the second duct 114 while maintaining the liquid-tight relationship between the coupler member 128 and the duct 114. The ability to allow relative movement between the coupler member 128 and the duct 114 is important because of the "match casting" used for the formation of the second concrete segment 104. If there is any warping or inconsistent relationship between the surfaces 106 and 108, the second coupler member 128 will be able to relatively move with respect to the exterior surfaces of the duct 114 to adjust for such warping or inconsistencies. The second coupler member 128 is also movable in relation to any expansion or contraction of the concrete segments 102 and 104. This can be done without affecting the liquid-tight environment between the coupler member 128 and the duct 114.

In FIG. 6, it can be seen that the end 126 of the first coupler member 124 has a generally V-shaped groove facing the second coupler member 128. In particular, it is the opening of this V-shaped groove which faces the second coupler member 128. Similarly, the end 130 of the second coupler member 128 is a V-shaped groove which faces the V-shaped groove of the end 126. It can be seen that the gasket 132 is fitted into the V-shaped groove at one of the ends 126 and 130 or into both of the ends 126 and 130.

So as to further assure the avoidance of any liquid intrusion, it can be seen that the end 126 of the first coupler member 124 has a surface 140 which is in abutment with the end 112 of the first duct 110. Similarly, the second coupler member 128 has a surface 142 which is in abutment with the end 116 of the second duct 114. This relationship further assures the accurate placement of the coupler members in end-to-end relationship and further assures the alignment of the ducts 110 and 114.

As can be seen in FIG. 6, the gasket 132 is an elastomeric ring having a cross-sectional thickness greater than a depth of either of the V-shaped grooves of the respective ends 126 and 130 of the coupler members 124 and 128. As a result, the elastomeric ring of the gasket 132 will effectively "fill" the outer portions of the V-shaped grooves. The configuration of the V-shaped grooves causes the elastomeric material of the gasket 132 to "extrude" thereinto so as to establish a tight sealing relationship therewith.

The first duct 110, the second duct 114, the first coupler member 124 and the second coupler member 128 are formed of a polymeric material. Each of these components can be formed in an injection molding process. Similarly, the gasket 132 can be formed of an elastomeric or other resilient material. The material used for the gasket 132 should be suitably hydrophobic so as to resist any liquid intrusion.

FIG. 7 is an illustration of the apparatus 100 prior to the installation of the tendons 118 and the installation of the grout 120. The first duct 110 is suitably mounted against a metal bulkhead having a flat surface corresponding to the formation of the exterior surface 106 of concrete segment 102. A suitable fixture is provided on the metal bulkhead which will extend into the interior 160 of the first duct 110. Prior to the installation of the first duct 110 onto the bulkhead fixture, the coupler member 124 is placed over the exterior surface of the first duct 110. Similarly, the external seal 134 is placed over the end 162 of the coupler member 124 opposite the end 126. A suitable heating device, such as a hot air blower, can be applied to the external seal 134 so as to heat shrink the seal 134 upon the exterior surface of the duct 110 and upon the exterior surface of the first coupler member 124. Once the duct 110, along with the attached coupler member 124, is placed upon the bulkhead fixture, the concrete 164 can then be poured into a suitable mold. After solidifying, the metal bulkhead and the attached bulkhead fixture are removed from the surface 106 so as to create a flat surface thereagainst. Upon solidification, the inner surface 108 of the concrete segment 104 will be formed by match casting. In other words, the surface 106 will act as a surface for the formation of surface 108. A suitable mandrel or alignment plug can be placed into the interior passageway 160 of the first duct 110. This alignment plug can extend outwardly beyond the surface 106. The second coupler member 128 can then be applied onto the exterior surface of the second duct 114. The internal seal 138 is interposed between the inner surface of the second coupler member 128 and the exterior surface of the duct 114. The second duct 114 and its associated coupler 128 can then be placed over the alignment plug extending outwardly of the interior passageway 160 of the duct 110 so as to extend into the interior passageway 166 of the second duct 114. Since there is a possibility of slight misalignment during the formation of the second concrete segment 104, the second coupler member 128 is slidable relative to the duct 114 by virtue of the "rollability" of the internal seal 138.

After the concrete solidifies, the surface 108 will be separated from surface 106. Similarly, the end 130 of the coupler member 128 will be separated from the end 126 of the coupler 124. The gasket 132 can then be installed into the V-shaped groove associated with the end 130 of the second coupler 128. Because of the enlarged cross-sectional area of the annular gasket 132, a portion of the gasket 132 will extend outwardly beyond the end 130 of the second coupler member 128.

The segment 102 can then be installed as part of the segmental structure. The segment 104 is then transported into position so that the surface 108 will face the surface 106. Since it is possible that a misalignment of the surface of the segments can occur, the particular arrangement of the V-shaped grooves and the shape of the gasket 132 will accommodate any misalignment. When the surface 108 is brought into proximity against the surface 106, the relatively pointed side 168 of the gasket 132 will "funnel" into the V-shaped groove 170 at the end 126 of the first coupler member 124. Particularly, the pointed side 168 may contact either of the sides 172 or 174 of the V-shaped groove 170. As the surface 108 is brought further into proximity with surface 106, the gasket 132 will extrude into the V-shaped groove 170 so as to establish an effective liquid-tight seal therewith. After assembling and epoxying of the surfaces 106 and 108 together, tendons can be extended through the interior passageways 160 and 166 of the respective ducts 110 and 114 so as to permanently join the segments 102 and 104 in post-tensioned relationship.

Importantly, as can be seen in FIG. 6, the use of the unique configuration of the gasket 132, along with V-shaped groove 170, will avoid any intrusion of epoxy into the interior passageways 160 and 166. The gasket 132 will block the extruded epoxy from flowing in an undesired manner into the interior passageways 160 and 166. In a similar manner, the gasket 132 will also prevent any liquid intrusion from passing into these interior passageways. The compressive relationship between the V-shaped grooves associated with the coupler members 124 and 128 establishes a strong sealing bond between the coupler members which will be resistive to the elements over an extended period of time. Subsequent to installation, the grout can be effectively pumped through the interior passageways 160 and 166 without any grout accidentally flowing outwardly of the ducts 110 and 114 in the area of the space between the segments 102 and 104. Secondary liquid intrusion is effectively accomplished through the tight sealing relationship of the external seal 134 and the sliding sealing of the internal seal 138.

U.S. Pat. Nos. 6,764,105, 6,834,890 and 6,874,821 show variations on this prior invention. In particular, U.S. Pat. No. 6,764,105, issued on Jul. 20, 2004 to the present inventor, teaches a coupler member for use with precast concrete segmental structures. This coupler member has a first duct, a first coupler member extending over and around an exterior surface of the first duct and having a seat opening adjacent an end of the first duct, a second duct, a second coupler member extending over and around an exterior surface of the second duct and a seat opening adjacent to an end of the second duct. A gasket is received in the seats of the first and second coupler members. An external seal is affixed to an opposite end of the first coupler member and affixed to an exterior surface of the first duct. The seats of the first and second coupler members have slots facing one another. The gasket is received within these slots. The gasket has a tapered outer surface suitable for liquid-tight abutment against an inner surface of one of the slots.

U.S. Pat. No. 6,834,890, issued on Dec. 28, 2004 to the present inventor, describes another coupler apparatus for use with tendon-receiving ducts in a segmental precast concrete structure. This coupler apparatus includes a coupler body having an interior passageway for receiving the duct therein. The coupler body has a generally U-shaped channel formed at one end thereof. The coupler element has a connector element formed on interior thereof adjacent one end of the coupler body so as to allow the coupler element to receive a variety of implements for the formation of the precast concrete segment.

One of the problems associated with these prior art patents is that each of these prior art patents is particularly designed where the tendons are maintained in generally longitudinal alignment. However, in precast concrete construction, the edges of the concrete segments will be aligned with each other while the ducts extend at an angle with respect to these edges. As such, it is necessary for the coupler apparatus to be able to accommodate the angled relationship of the ducts. Since each of the coupler segments must open at an end of the concrete structure and be joined together at such end, the coupler apparatus must be able to accommodate the fact that the ducts extend at an angle with respect to these ends. As such, U.S. Pat. No. 6,874,821, issued on Apr. 5, 2005 to the present inventor, was designed to accommodate this angled relationship of the ducts. This patent describes a coupler apparatus for use with precast concrete segmental construction. The coupler apparatus has a first duct, a first coupler member extending over and around the first duct, a second duct, a second coupler member extending over and around the second duct, and a gasket received at the ends of the first and second coupler members so as to prevent liquid from passing between the coupler members into an interior of either of the ducts. The ducts extend at a non-transverse acute angle with respect to the ends of the coupler members. Heat shrink seals are affixed to the opposite ends of the coupler members so as to secure the coupler members to the ducts in liquid-tight relationship. The ends of the coupler members have generally V-shaped grooves facing each other. The gasket is received in compressive relationship within the V-shaped grooves.

Although the device shown in U.S. Pat. No. 6,874,821 is effective for connecting angled post-tension cables in precast concrete segmental construction, it is believed important to be able to flexibly arrange the positioning of the ducts with respect to the coupler members. As such, a need developed so as to provide a structure whereby the angled relationship of the ducts can be easily and effectively achieved through the use of standard coupler constructions.

It is an object of the present invention to provide a coupler apparatus which allows for the coupling of multi-tendon ducts in precast segmental concrete structures.

It is another object of the present invention to provide a coupler apparatus which automatically adjusts for any misalignments or warpage in the matching concrete segments.

It is another object of the present invention to provide a coupler apparatus which assures a seal between the coupler and the connected duct.

It is still a further object of the present invention to provide a coupler apparatus which is easy to install, easy to use and easy to manufacture.

It is still a further object of the present invention to provide a coupler apparatus which effectively prevents the intrusion of an epoxy into the interior of the duct during the sealing of one structural segment to another structural segment.

It is a further object of the present invention to provide a symmetrical duct coupler which facilitates the ability to manufacture and install the components thereof.

It is still a further object of the present invention to provide a coupler apparatus which is universally adaptable between ducts that extend transverse to the edges of the segmental construction to those ducts that extend at an angle with respect to edge of the concrete structure.

It is still a further object of the present invention to provide a coupler apparatus that flexibly allows the ducts to move longitudinally toward or away from each other within the concrete structure.

These and other objects and advantages of the present invention will become apparent from a reading of the attached specification and appended claims.

BRIEF SUMMARY OF THE INVENTION

The present invention is a coupler apparatus for use with concrete segments that comprises a first duct having an end and an exterior surface, a first coupler member having a connector and a flexible boot extending therefrom in which the flexible boot has an end extending over and around the exterior surface of the first duct, a second duct having an end and an exterior surface, a second coupler member having a connector and a flexible boot extending therefrom in which the flexible boot extends over and around the exterior surface of the second duct, and a gasket received in the connectors of the first and second coupler members for forming a liquid-tight seal between the first and second ducts.

The present invention further comprises a first clamping means affixed over the end of the flexible boot of the first coupler member for sealing the end of the flexible boot in liquid-tight relation over the first duct. A second clamping means is affixed over the end of the flexible boot of the second coupler member for sealing the end of the flexible boot of the second coupler member in liquid-tight relationship over the second duct. Each of the first and second clamping members is an annular member affixed in compressive contact over the flexible boot of the coupler member so as to exert a compressive force against the exterior surface of the duct.

The connector of the first coupler member is a generally rigid structure. Similarly, the connector of the second coupler member is also of a generally rigid structure. The connectors of the first and second coupler members have an annular surface formed around an opposite end coupler member. This surface has a groove with a generally U-shaped cross-section.

The connector of the first coupler member comprises an annular section affixed to an opposite end of the flexible boot and an annular surface formed at an end of the annular section opposite the flexible boot. This annular section has an outer surface affixed within the interior of the opposite end of the flexible boot. The annular surface is formed radially outwardly of the annular section and longitudinally outwardly of the flexible boot. The gasket is received within the annular surface.

A clamp is affixed over an outer surface of the opposite end of the flexible boot so as to compress the opposite end of the flexible boot against the outer surface of the annular section in liquid-tight sealing relationship therewith.

The gasket of the present invention includes a first annular gasket received in the connector of the first coupler member, and a second annular gasket received in the connector of the second coupler member. The first annular gasket is in compressive sealing contact with the second annular gasket. The annular section of the first coupler member is in axial alignment with the annular section of the second coupler member. The flexible boot of the first coupler member allows the first duct to be movable angularly and longitudinally with respect to the longitudinal axis of the annular section of the first coupler member. Similarly, the flexible boot of the second coupler member allows the second duct to be movable angularly and longitudinally with respect to a longitudinal axis of the annular section of the second coupler member.

For purposes of describing the present invention, the annular groove 212 is hereinafter the same as the annular surface.

BRIEF DESCRIPTION OF THE SEVERAL VIEWS OF THE DRAWINGS

FIG. 2 is a partially diagrammatic view showing a cross-section indicating the assemblage of the concrete segments of the structure of FIG. 1 and showing, in particular, the alignment of the post-tensioning cables.

FIG. 3 is an end view of a precast concrete segment, and the associated post-tension cables, of the prior art structure if FIG. 1.

FIG. 4 is a diagrammatic cross-sectional view showing the prior art techniques for the routing of a cable through the duct associated with the concrete segment.

DETAILED DESCRIPTION OF THE INVENTION

Figure 1:
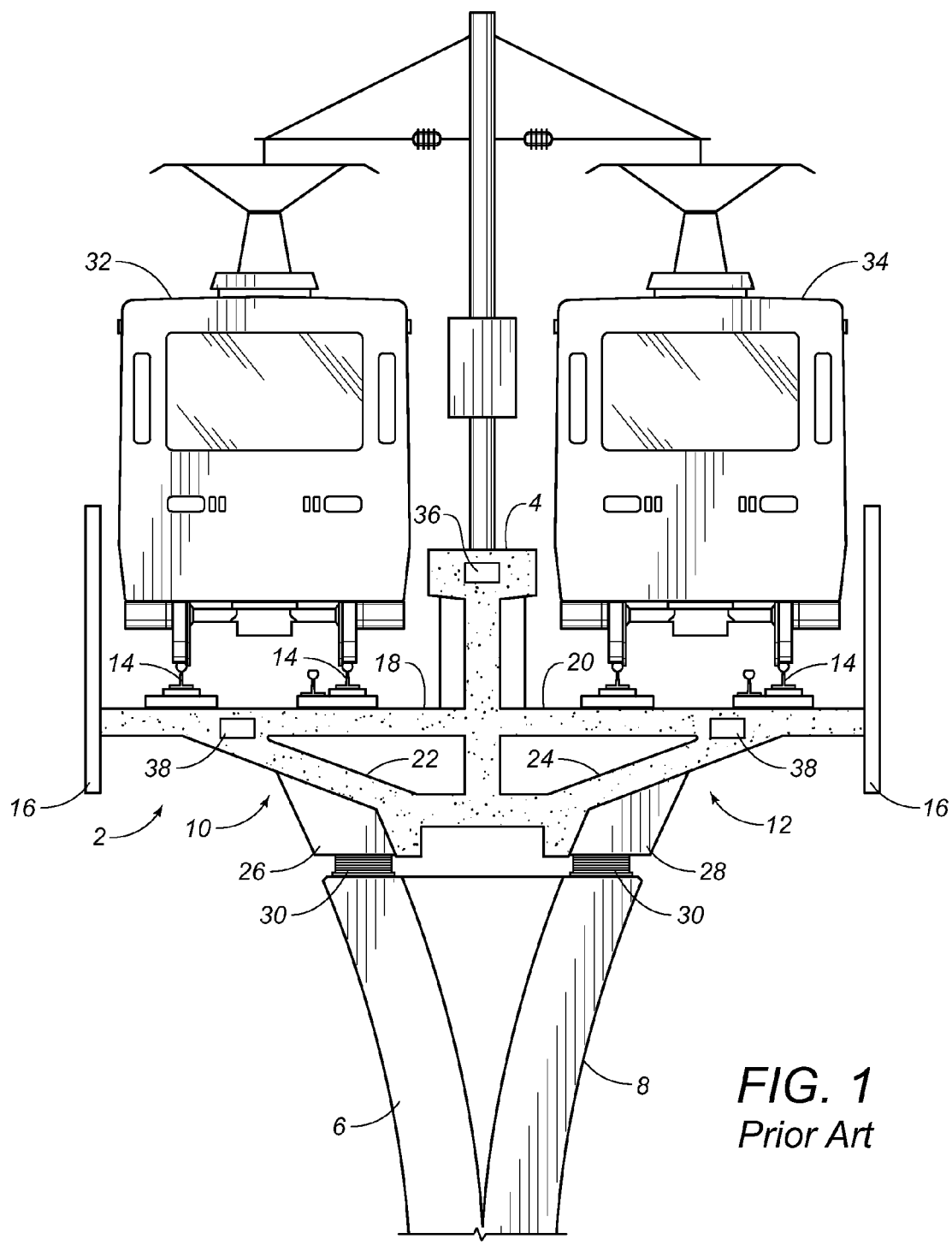
FIG. 1 is a diagrammatic view showing a cross-section of a rapid transit viaduct structure employing a prior art precast segmental structure.
Figure 5:
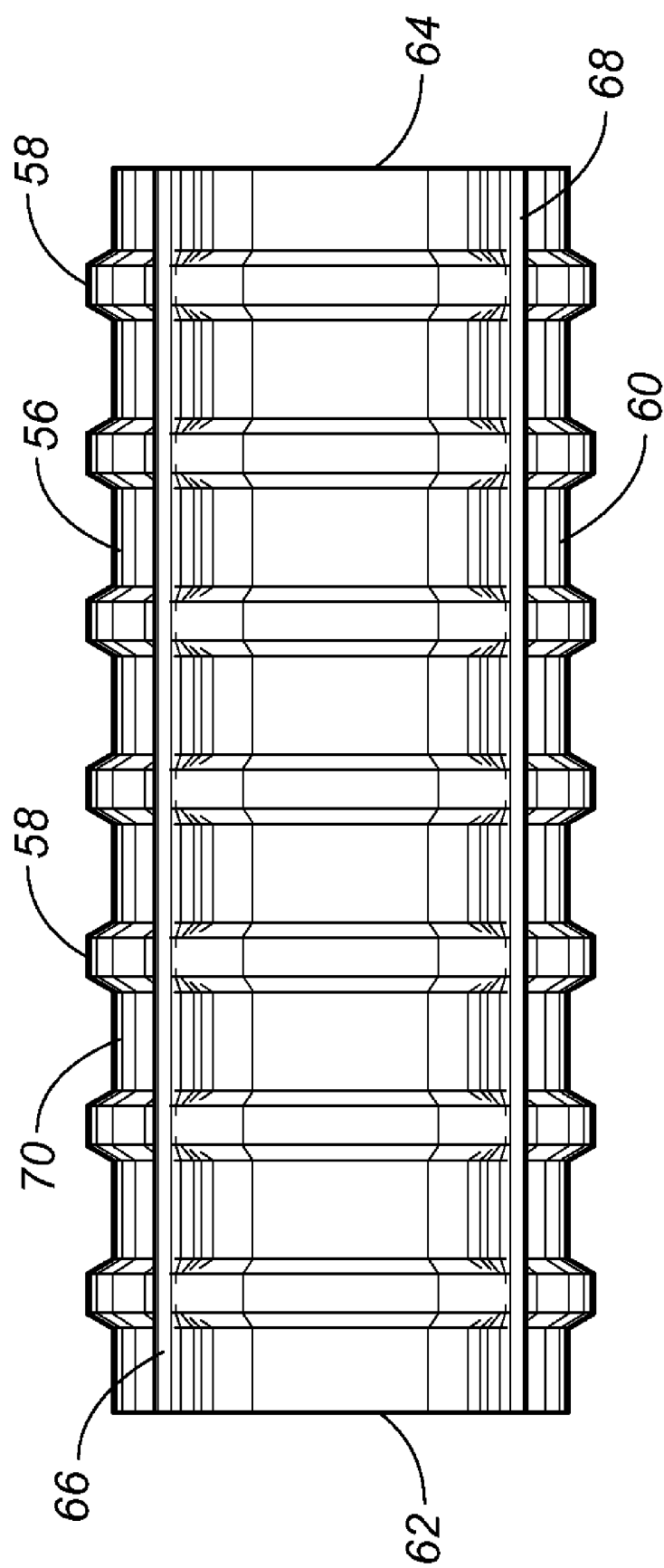
FIG. 5 is a side elevational view of a prior art multi-cable duct as used in the present invention.
Figure 6:
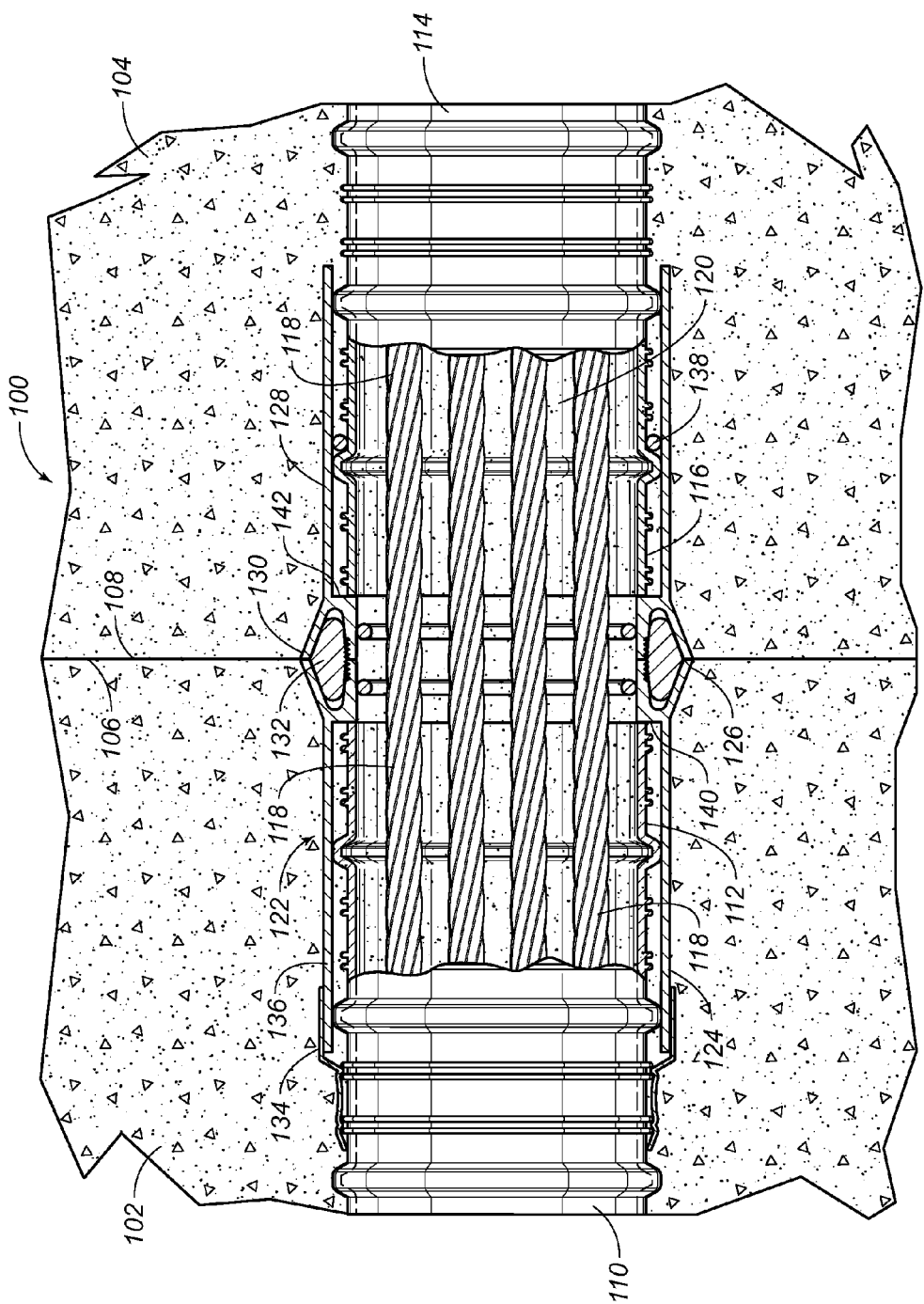
FIG. 6 is a cross-sectional view showing the coupler assembly as used in a precast concrete segmental structure of the prior art.
Figure 7:
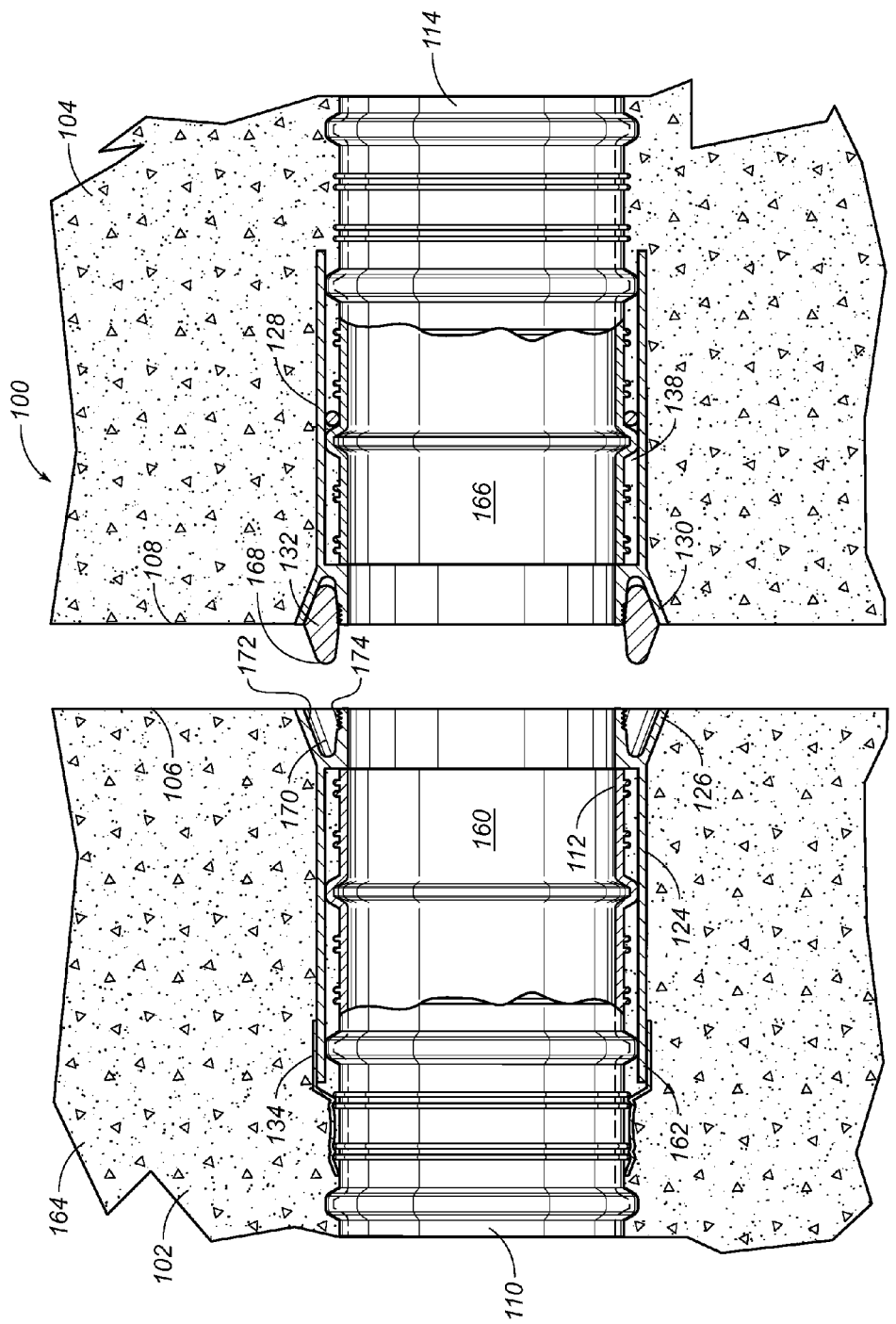
FIG. 7 is a cross-sectional view showing the assembly of the coupler apparatus of the prior art of FIG. 6.
Figure 8:
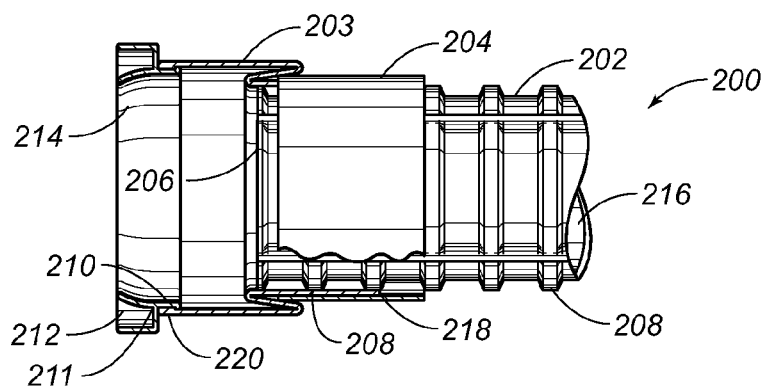
FIG. 8 is a side elevational and partially cross-sectional view of the coupler apparatus of the present invention.

Referring to FIG. 8, there is shown the coupler apparatus 200 in accordance with the teachings of the present invention. The coupler apparatus 200 includes a duct 202 having a flexible boot 203 connected over an end 206 thereof. A clamp 204 is placed around the outer diameter of the flexible boot 203 and over the outer diameter of the duct 202 so as to secure the end of the flexible boot 203 in liquid-tight sealing relationship against the ridges 208 of the duct 202. The flexible boot 203 has an annular section 210 connected to an end of the flexible boot 203 opposite the duct 202. The annular section 210 includes an annular groove 212 formed outwardly thereof. The annular groove 212 defines an interior passageway 214 therein. Annular passageway 214 is aligned with the interior passageway 216 of the duct 202.

As can be seen in FIG. 8, the flexible boot 203 can be folded upon itself so that the duct 202 is in linearly aligned relationship with connector 211, formed by the annular section 210 and with the annular groove 212. Additionally, the flexible boot 203 can be folded upon itself so as to allow the duct 202 to move longitudinally with respect to the position of the annular section 210.

The clamp 204 is also an annular surface that has an inner surface juxtaposed against the exterior surface of the end 218 of the flexible boot 203. In normal use, this "clamp means" can include various structures that serve to establish a strong compressive contact between the inner surface of the flexible boot 203 and the exterior surface of the ridges 208 of duct 202. For example, a lever-type mechanism can be incorporated into the structure of the clamp 204 so as to create this compressive contact. In other circumstances, the clamp 204 can be in the nature of a band of heat-shrink material. When heat is applied to the heat-shrink material, it will establish a strong bonding relationship over of the exterior surface of the end 218 of the flexible boot 203 while, at the same time, creating the requisite compressive contact between the inner surface of the end 218 of boot 203 and the exterior surfaces of the ridges 208 of the duct 202. Other types of mechanisms, such as retracting clamps, threaded braces, and other devices can be utilized in association with the boot 203 so as to establish the "clamping means".

The opposite end 220 of the flexible boot 203 is fixed secured to the annular section 210. The annular groove 212 extends radially outwardly of the annular section 210 and also longitudinally outwardly of the end 220 of the flexible boot 203. In normal use, and will be described hereinafter, the annular groove 212 will receive a gasketing material therein. The annular groove 212 will face the outer wall of the concrete segment.

Figure 9:
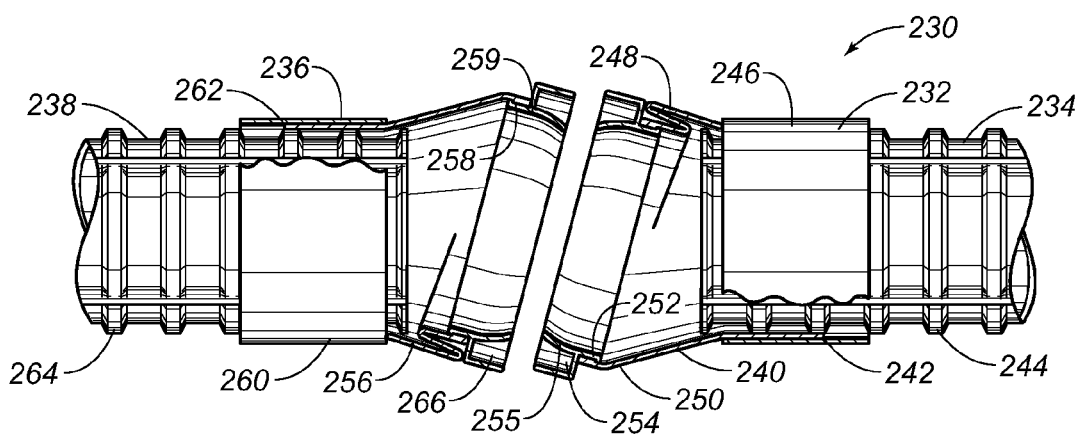
FIG. 9 is a side elevational view, in partial cross-section, of the coupler assembly of the present invention.

FIG. 9 shows the coupler assembly 230 of the present invention. As can be seen, the coupler assembly 230 includes a first coupler apparatus 232 affixed over the exterior of a first duct 234 and a second coupler apparatus 236 secured over the exterior surface of the second duct 238. The first coupler apparatus 232 includes a boot 240 that has an end 242 in compressive sealing contact against the outer surface of one of the ridges 244 of the first duct 234. A suitable clamping means 246 is used so as to establish this strong compressive contact.

The boot 240 is shown as having one side 248 that is folded upon itself while the opposite side 250 extends outwardly. This allows the annular section 252 to be extended at an angle in relationship to the longitudinal axis of the duct 234. The annular groove 254 faces outwardly of the annular section 252.

The second coupler apparatus 236 also includes a flexible boot 256 that is connected at one end to an annular section 258. A clamp 260 is utilized so as to establish a strong sealing relationship between the end 262 of the flexible boot 256 and the outer surface of one of the ridges 264 of the duct 238. As such, the second coupler apparatus 236 has an identical configuration to that of the first coupler apparatus 232. The boot 256 has one side that is folded upon itself while the other side is fully extended. As such, the connector 259, formed by the annular groove 266 and the annular section 258 of the second coupler apparatus 236 directly faces connector 255, formed by the annular groove 254 and the annular section 252 of the first coupler apparatus 232. In the configuration illustrated in FIG. 9, the coupler assembly 230 is particularly configured for use in which the tendons of the segmental concrete structure are intended to be extended at an angle with respect to the edges of the concrete structure.

Figure 10:
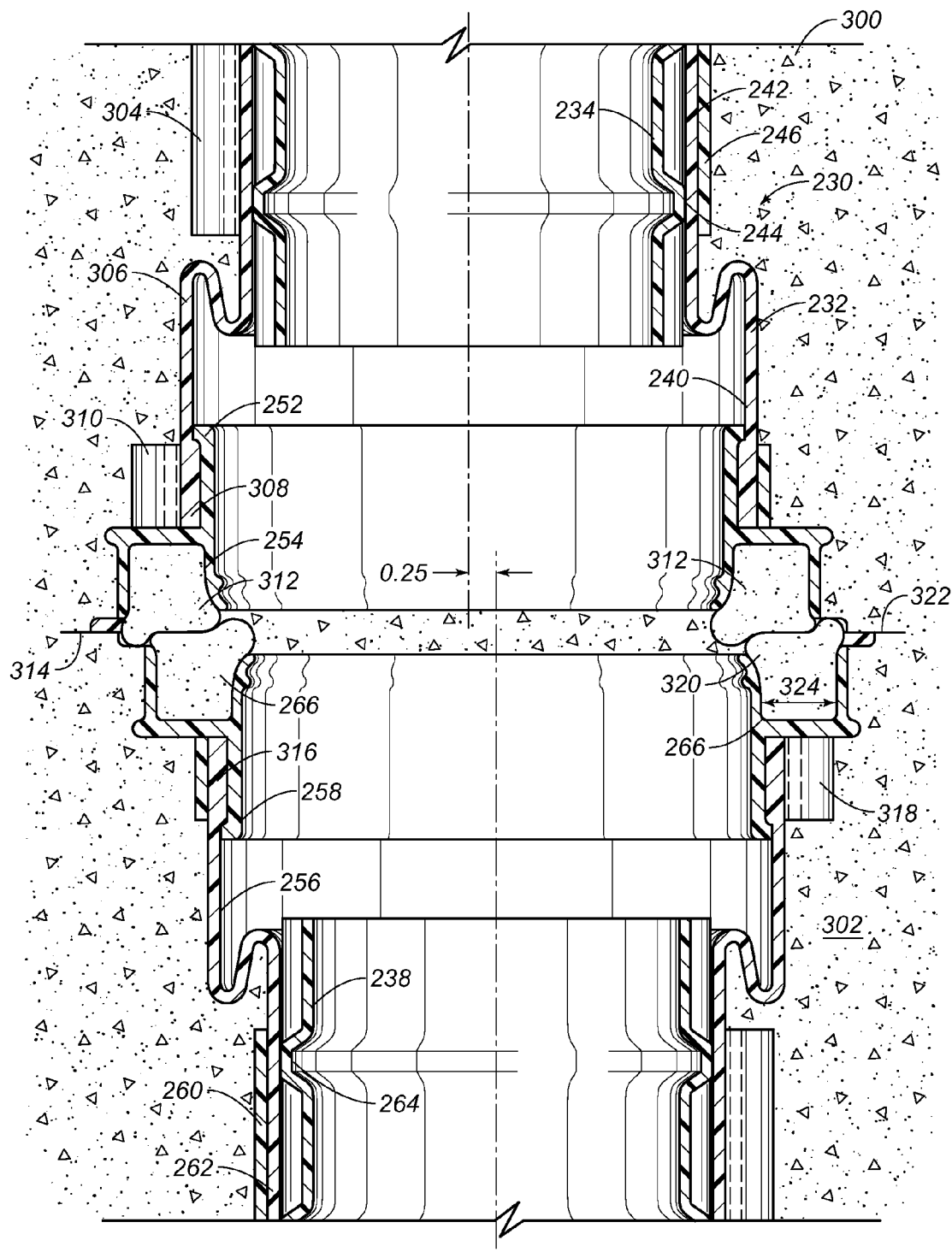
FIG. 10 is a cross-sectional view showing the coupler assembly of the present invention as positioned within a concrete structure such that the ducts associated with the coupler assembly are in generally axial alignment.

FIG. 10 shows a detailed view where the coupler apparatus 230 has been installed within concrete segments 300 and 302. Concrete segments 300 and 302 are formed in the manner described hereinbefore in relationship to the prior art. In particular, it can be seen that the first coupler apparatus 232 has its boot 240 directly affixed over the ridge 244 of the duct 234. The clamping means 246 is affixed over the end 242 of the boot 240 so as to establish a strong compressive relationship between the inner surface of the end 242 of boot 240 and the outer surface of the ridge 244 of duct 234. A particular clamping mechanism 304 is illustrated as causing the compressive contact between the inner surface of the end 242 of boot 240 and the outer surface of the ridge 244.

As can be seen in FIG. 10, the boot 240 has a portion 306 that is folded upon itself. As such, this folding of the flexible boot 232 allows the duct 234 to move slightly longitudinally in one direction or another to and from the annular section 252. The boot 240 has an end 308 that is fixed over the exterior surface of the annular section 252. Another clamping means 310 extends over the exterior surface of the end 308 of boot 240 so as to establish a strong compressive contact between the end 308 of boot 240 and the outer surface of the annular section 252. Once again, as stated before, this clamping means 310 can take a wide variety of constructions. The annular groove 254 extends outwardly of the annular section 252. The annular groove 254 has a generally U-shaped cross-section. The groove 254 extends radially outwardly of the annular section 252 and longitudinally outwardly of the end 308 of the flexible boot 240. A gasket 312 is received within the interior of the annular groove 254 and extends outwardly therefrom for a small distance. The annular groove 254 opens at the edge 314 of the concrete structure 300. The annular groove 254 has a width of approximately 0.70 inches. As such, the gasket 312 is relatively wide. This serves to accommodate any offsets that may occur between the longitudinal alignment of the first duct 234 and the second duct 238.

The second duct 238 includes its ridges 264 which has an outer surface in compressive sealing contact with the end 262 of the boot 256. The clamping means 260 (as described hereinbefore) extends around the outer surface of the end 262 of the flexible boot 256 so as to establish this strong sealing liquid-tight relationship between the end 262 of the boot 256 and the outer surface of the ridge 264 of second duct 238. The end 316 of the flexible boot 256 is affixed to the outer surface of the annular section 258. Another clamping means 318 serves to fix the end 316 of flexible boot 256 in compressive liquid-tight sealing contact with the exterior surface of the annular section 258. The annular groove 266 extends outwardly of the annular section 258 and also outwardly longitudinally from the end 316 of the flexible boot 256. A gasket 320 is received within the annular groove 266. Gasket 320 has a portion that extends slightly outwardly of the annular groove 266. The annular groove 266 will open at the edge 322 of the concrete structure 302. When the concrete structures 300 and 302 are placed in surface-to-surface contact, the outer surfaces of the gasket 312 will be in strong sealing contact with the outer surface of gasket 320. An effective liquid-tight seal is established between the ducts 234 and 238 of the coupler assembly. The width of the seal, illustrated by arrow 324, allows the first duct 234 to be slightly longitudinally offset from the second duct 238. As such, the present invention provides flexibility such that exact alignment is not required between the ducts.

Figure 11:
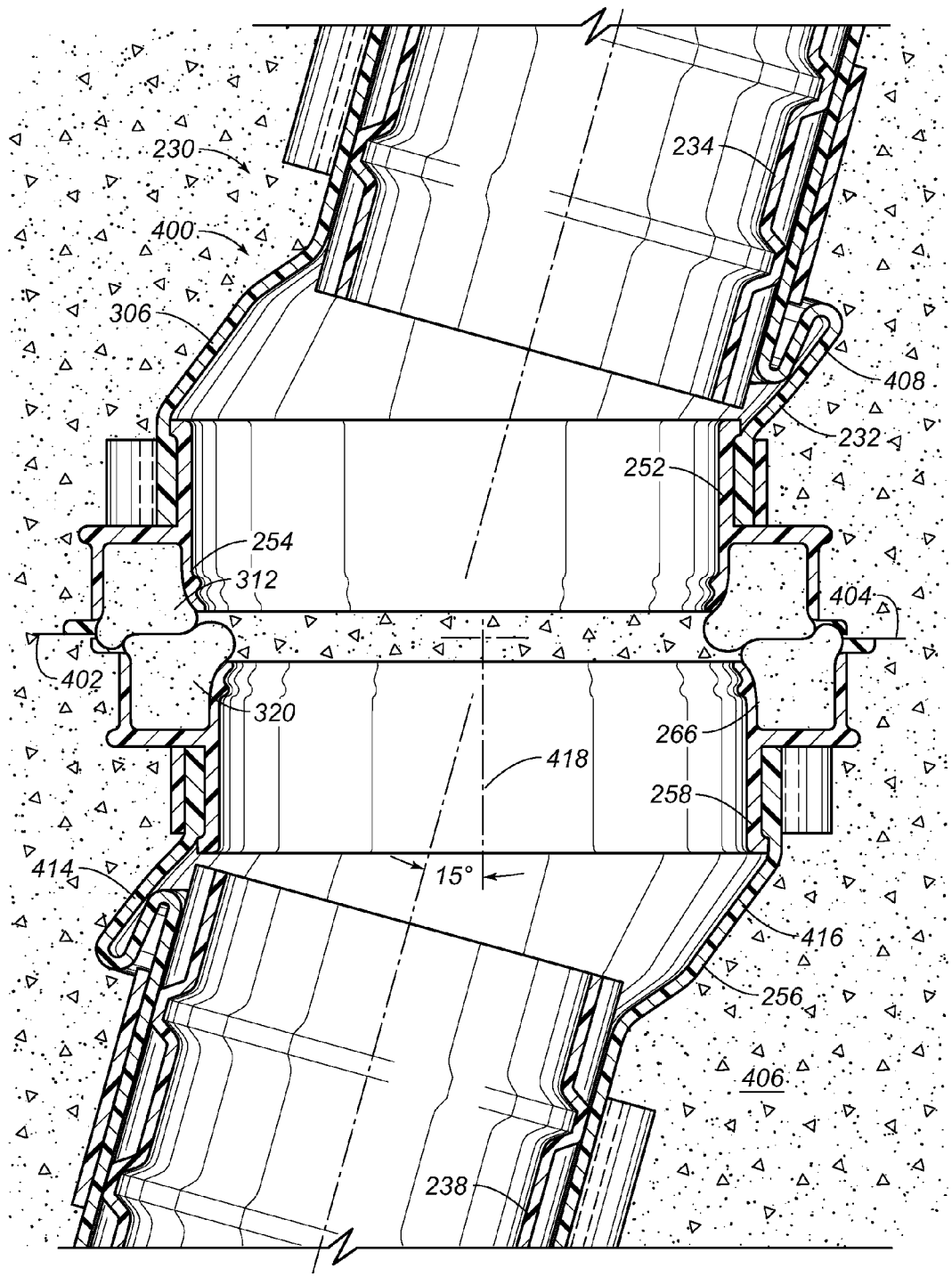
FIG. 11 is a cross-sectional view of the coupler assembly of the present invention as shown as embedded in concrete in which the ducts extend in angular relationship to the coupler members and in angular relationship with respect to the edges of the concrete structure.

FIG. 11 illustrates the coupler apparatus 230 as installed within concrete structures 400 and 406. Concrete structure 400 includes an outer surface 402. The concrete structure 406 includes an outer surface 404. Surfaces 402 and 404 face each other and are juxtaposed thereagainst.

In FIG. 11, it can be seen that the first duct 234 is in generally longitudinal alignment with the second duct 238. However, the first duct 234 extends at an angle offset by approximately 15° from transverse to the surface 402. Similarly, the second duct 238 extends at an angle of approximately 15° offset from transverse to the surface 404. As a result, the ducts 234 and 238 are designed to accommodate tendons that extend at an angle through the interior thereof.

In particular, in FIG. 11, it can be seen that the boot 232 of the first duct 234 has a surface 408 that is folded upon itself while the other surface 306 extends lengthwise. The flexibility of the boot 232 allows for this easy folding. This is accomplished while the annular section 252 has a longitudinal axis extending transverse to the surface 402. As a result, the flexible boot 232 allows the duct 234 to extend at an angle with respect to the longitudinal axis of the annular section 252. The annular groove 254 has gasket 312 received therein. The annular groove 254 opens at the exterior surface 402 of the concrete structure 400.

Similarly, the boot 256 attached to the second duct 238 includes a section 414 that is folded upon itself while the opposite side 416 extends in a lengthwise manner. This folding of side 414 with respect to side 416 allows the duct 238 to extend at an acute angle to the longitudinal axis 418 of the annular section 258. The annular groove 266 extends so as to open at the surface 404 of concrete structure 406. The gasket 320 is in strong sealing surface-to-surface contact with the seal 312. As such, liquid intrusion into the interior of the ducts 234 and 238 is effectively prevented.

In the present invention, the use of the respective boots in the coupler apparatus allows flexibility when installing the ducts associated with a segmental concrete structure. In particular, the flexible boots allow the tendons to extend in alignment with the annular section in angularly offset relationship to the annular section. If there is any effect of expansion of the polymeric ducts, then the flexibility of the boots can accommodate any expansion. The use of the boot establishes a strong sealing relationship between the annular sections and the respective ducts.

As used herein, the remaining installation, including tendon assemblies, can be accomplished in the manner of the prior art.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

I claim:

1. A coupler apparatus for use with concrete segments comprising:
   a first precast concrete segment comprising:
   a first duct having an end and an exterior surface;
   a first coupler member having a connector and a flexible boot extending therefrom, said flexible boot having an end opposite said connector extending over and around said exterior surface of said first duct at said end thereof, said flexible boot suitable for allowing a longitudinal axis of said connector to extend at a non-linear orientation with respect to a longitudinal axis of said first duct;
   a second precast concrete segment comprising:
   a second duct having an end and an exterior surface;
   a second coupler member having a connector and a flexible boot extending therefrom, said flexible boot of said second coupler having an end opposite said connector extending over and around said exterior surface of said second duct at said end thereof, said flexible boot of said second coupler member suitable for allowing a longitudinal axis of said connector of said second coupler member to extend at a non-linear orientation with respect to a longitudinal axis of said first duct; and
   a gasketing means received in said connectors of said first and second coupler members for forming a liquid-tight seal between said first and second ducts.

2. The coupler apparatus of claim 1, further comprising:
   a first clamping means affixed over said flexible boot of said first coupler member, said first clamping means for sealing said end of said flexible boot in liquid-tight relation over said first duct; and
   a second clamping means affixed over said flexible boot of said second coupler member, said second clamping means for sealing said end of said flexible boot of said second coupler member in liquid-tight relationship over said second duct.

3. The coupler apparatus of claim 2, said first clamping means being an annular member affixed in compressive contact over said flexible boot of said first coupler member, said second clamping means being an annular member affixed in compressive contact over said flexible boot of said second coupler member.

4. The coupler apparatus of claim 1, said connector of said first coupler member being a generally rigid structure, said connector of said second coupler member being a generally rigid structure.

5. The coupler apparatus of claim 4, said connector of said first coupler member having an annular groove formed around an end of said first coupler member, said connector of said second coupler member having an annular groove formed around an end of said second coupler member.

6. The coupler apparatus of claim 5, said groove having a generally U-shaped cross-section.

7. The coupler apparatus of claim 1, said connector of said first coupler member comprising:
   an annular section affixed to an opposite end of said flexible boot of said first coupler member; and
   an annular groove formed around said annular section at an end opposite said flexible boot of said first coupler member.

8. The coupler apparatus of claim 7, said annular section having an outer surface affixed within said interior of said opposite end of said flexible boot.

9. The coupler apparatus of claim 8, said annular groove formed radially outwardly of said annular section and longitudinally outwardly of said flexible boot, said gasketing means received in said annular groove.

10. The coupler apparatus of claim 8, further comprising:
    a clamp member affixed over an outer surface of said opposite end of said flexible boot so as to compress said opposite end of said flexible boot against said outer surface of said annular section in liquid-tight sealing relation therewith.

11. The coupler apparatus of claim 7, said connector of said second coupler member comprising:
    an annular section affixed to an opposite end of said flexible boot of said second coupler member, said annular section of said second coupler member being axially aligned with said annular section of said first coupler member.

12. The coupler apparatus of claim 11, said flexible boot of said first coupler member allowing said first duct to be movable angularly with respect to a longitudinal axis of said annular section of said first coupler member, said flexible boot of said second coupler member allows said second duct to be movable angularly with respect to a longitudinal axis of said annular section of said second coupler member.

13. The coupler apparatus of claim 1, said gasketing means comprising:
    a first annular gasket received in said connector of said first coupler member; and
    a second annular gasket received in said connector of said second coupler member, said first annular gasket being in compression sealing contact with said second annular gasket.

* * * * *